Nov. 12, 1968  F. A. KRUSEMARK  3,410,152
MECHANICAL LINKAGE
Filed Feb. 1, 1966  3 Sheets-Sheet 1
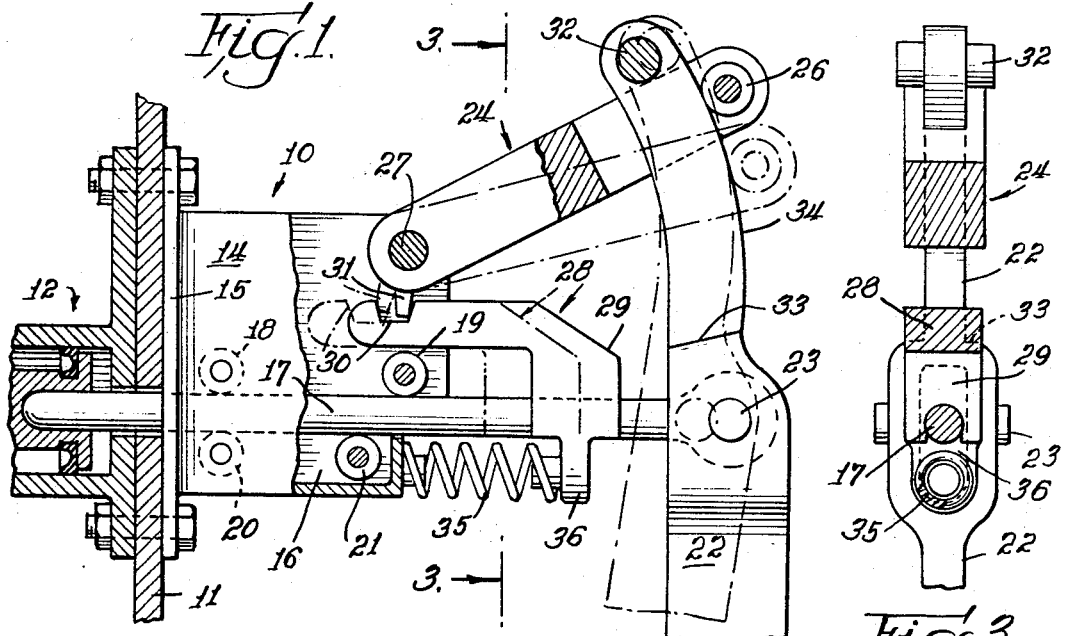
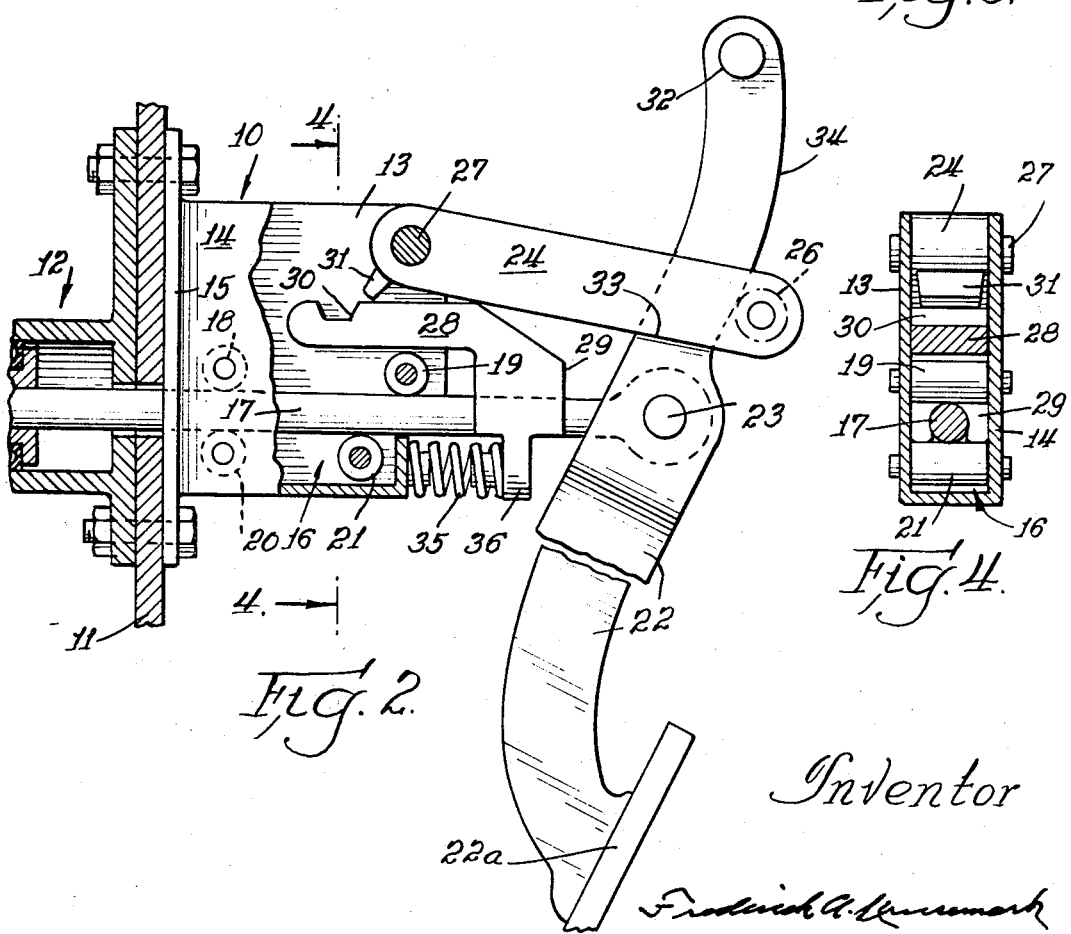
Inventor
Frederick A. Krusemark

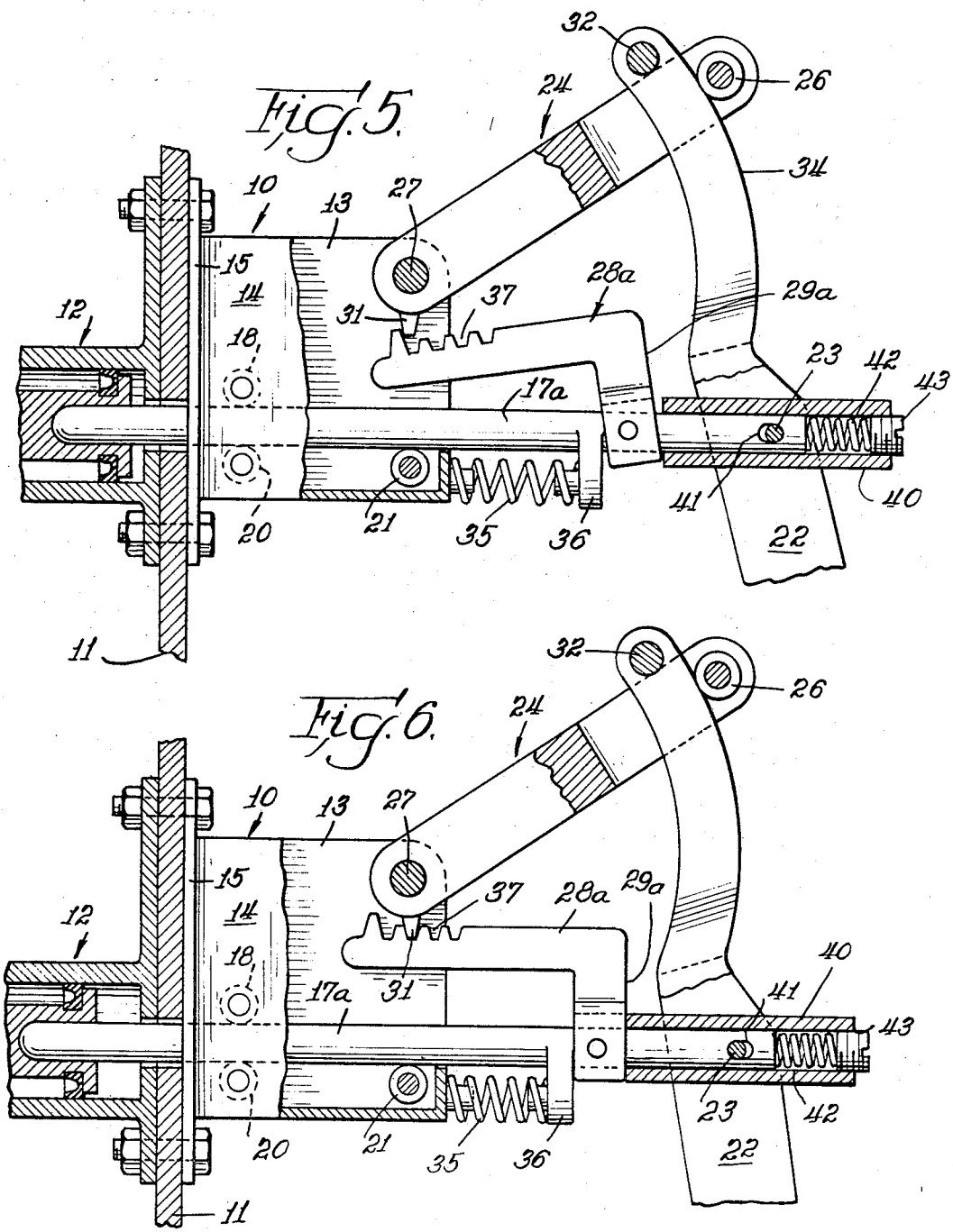

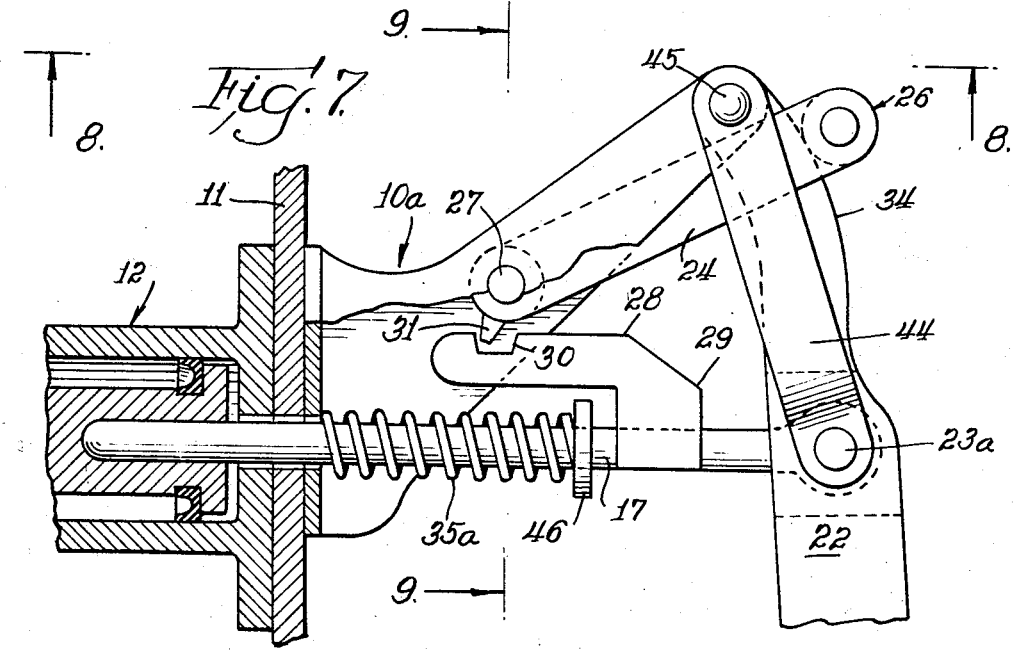
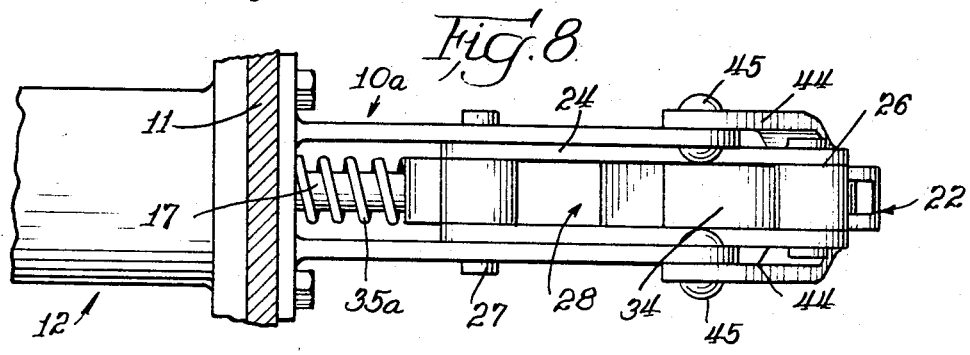
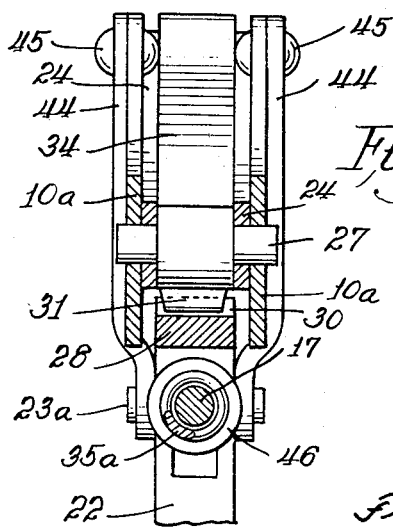

United States Patent Office 3,410,152
Patented Nov. 12, 1968

3,410,152
MECHANICAL LINKAGE
Frederick A. Krusemark, 303 S. 2nd Ave.,
Maywood, Ill. 60153
Filed Feb. 1, 1966, Ser. No. 524,115
10 Claims. (Cl. 74—516)

ABSTRACT OF THE DISCLOSURE

A mechanical linkage, supported by framework, comprising an arm serving as a lever which has a rod pivotally connected thereto for moving a work load. A fulcrum arm is pivotally connected at one end to the framework and at the other end is provided with a roller fulcrum which operably engages an arcuate end of the arm above the pivot point, whereby, when force is applied to the other end of the arm to move a workpiece the roller fulcrum is moved toward the pivot point thereby reducing the effort required to move the work load. Also, means, operably associated with the fulcrum arm and the rod, are provided which causes the fulcrum roller to move to, and remain at a predetermined point at the time the rod reaches a predetermined distance of travel calculated from the time the fulcrum roller starts rolling.

---

My invention relates to mechanical linkage and more particularly adapted for use in the operation of a brake system for various kinds of vehicles such as an automobile.

My invention when adapted for use in the operation of a brake system for automobiles is provided with a moving fulcrum associated with the pedal arm which in the first instant is static during the period required to take up what is normally termed the slack, after which the fulcrum moves progressively, which progressively provides a mechanical advantage as the p.s.i. progressively increase. The p.s.i. may be termed the work load.

A modified form of my invention includes a means for sensing the master cylinder pressure which based upon a predetermined value sets additional means in operation to set in motion a fulcrum hereinafter more fully explained.

The mechanical linkage according to my invention is simple in construction and low in manufacturing costs.

It is, therefore, an object of my invention to provide an improved mechanical linkage for the operation of a brake system which is provided with a moving fulcrum.

It is another important object of my invention to provide an improved mechanical linkage for the operation of a brake system which is provided with a means for sensing the pressure in the master cylinder which at a predetermined value initiates the movement of a moving fulcrum associated with the pedal arm.

It is also an important object of my invention which provides an improved mechanical linkage for the operation of a brake system which is simple in construction and low in manufacturing costs.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIGURE 1 is a side elevation, partially fragmentary, of the mechanical linkage according to my invention connected to the firewall of an automobile showing the parts in brake release position;

FIGURE 2 is the same view shown in FIGURE 1, except that the parts are shown in brake applied position;

FIGURE 3 is a view taken on line 3—3 of FIGURE 1 in the direction shown;

FIGURE 4 is a cross section taken on line 4—4 FIGURE 2 in the direction shown;

FIGURE 5 is an elevational view partially fragmentary of a modified form of my invention in its brake release position showing sensing means and components which initiate the movement of a fulcrum;

FIGURE 6 is the same view shown in FIGURE 5 except for the change in position of the parts with respect to initiating movement of a fulcrum.

FIGURE 7 is a side elevation, partially fragmentary, of another form of my invention shown in FIGURE 1;

FIGURE 8 is a view taken on line 8—8 of FIGURE 7 in the direction shown; and

FIGURE 9 is a view taken on line 9—9 of FIGURE 7 in the direction shown.

Like characters of reference designate like parts in the several drawings.

Referring now to FIGURE 1, which shows a linkage according to my invention which comprises a framework 10 fastened to the firewall 11 of an autmobile in alignment with a master cylinder 12 fastened to the opposite side thereof. The framework 10 comprises a pair of parallel walls 13 and 14 more clearly shown in FIGURE 4, each provided with flange means 15 for use in attaching the framework 10 to the firewall 11 as shown.

The lower portion of the framework 10 is provided with a channel 16 between the parallel walls 13 and 14 for receiving an operating rod 17 which is slidably enclosed above and below by two pairs of rollers 18 and 19, and 20 and 21, respectively, whereby the operating rod 17 serves as a support for a brake pedal arm 22 carrying a brake pedal 22a, which is pivotally connected to the operating rod 17 by a pivot pin 23.

A fulcrum arm 24 terminates in a yoke at one end which carries a fulcrum 26 preferably of the type that may be termed a rolling fulcrum. At the other end thereof the fulcrum arm 24 is pivotally mounted between the upper portions of the parallel walls 13 and 14 by suitable means such as a pivot pin 27.

An operating rod arm 28 parallel with the operating rod 17 is connected thereto by a downwardly extending portion 29. The push rod arm 28 is provided with a slot 30 operably associated with a downward extension 31 of the fulcrum arm 24.

The upper end of the arm 22, operable within the yoke 25, is provided with stops 32 and 33 which limit the upward and downward movement of the fulcrum arm 24 and is further provided with a face 34 arcuate in contour, such that the rolling fulcrum 26 which rolls thereon in the operation of the brake pedal arm 22 is substantially at a right angle at the point of contact to a plane intersected by a line intersecting the pivot pin 27 and the rolling fulcrum 26.

A spring 35 is biased between a projection 36 extending downwardly from the operating rod 17, and the lower end of the framework 10 whereby the brake pedal arm 22 and other linkage components are urged to return to their brake release position.

In FIGURES 5 and 6, a modified form of my invention is shown in which the operating rod arm 28 is replaced by a pivoted operating rod arm 28a provided with a plurality of teeth 37 operably associated with the depending extension 31, and a downwardly extending portion 29a is pivotally connected to the operating rod 17 by a pivot pin 38.

It is apparent that in FIGURE 5, the operating rod arm 28a is in disengaged position with respect to the downward extension 31 and that the reverse is true as shown in FIGURE 6. The change in component structure which brings this about comprises a sleeve 40 slidably assembled over an operating rod 17a having an elongated slot 41 therethrough in matching alignment with openings through the brake pedal arm 22 and sleeve 40 for receiving the pivot pin 23. A compression spring 42 within the sleeve 40 is interposed between the end of the operating rod 17a and a plug 43 threaded into the end of the sleeve 40.

The end of the sleeve 40 adjacent the downwardly extending portion 29a is in close proximity thereto as shown in FIGURE 5 whereby when the pressure applied to the brake pedal arm 22 is such that the p.s.i. in the master cylinder exceeds the value of the compression spring 42, the sleeve 40 engages the downwardly extending portion 29a thereby moving the pivoted operating rod arm 28a upwardly into operable engagement with the downward extension 31 as shown in FIGURE 6. Any additional pressure exerted with respect to the brake pedal arm 22 will cause the fulcrum arm 24 to move downwardly, thereby setting in motion the rolling fulcrum 26.

It is well known that increasing the mechanical advantage beyond a certain point cannot be tolerated at the expense of increased pedal travel. According to my invention the mechanical advantage can be increased substantially beyond the norm without increasing the pedal travel. In order to provide a clear description of how this is accomplished it is appropriate to start with a "given brake system" to which a mechanical linkage according to my invention is applied.

Accordingly I shall start with a "given brake system" which comprises a master cylinder piston and wheel cylinders of a geometry such that a pedal arm 12 inches long, with a 5 to 1 ratio will cause the master cylinder piston to travel approximately .70 of an inch for a crash stop with a pedal pressure of approximately 80 pounds under conditions of optimum adjustment. Based on the above ratio the pedal arm would be connected to the operating arm at about 2 inches below the fulcrum and 10 inches above the pedal. Therefore, for a crash stop the pedal travel would be 5×.70 inches or 3½ inches.

Applying my mechanical linkage to the above brake system, calls for a pedal arm which, initially, provides a ratio of 10 to 3 based on a geometry, such, that the distance between the rolling fulcrum 26 and the point of connection with the operating rod 17, is 3 inches, initially, and the distance between the point of connection with the operating rod 17 and the brake pedal 22a, is 10 inches.

When pressure is applied to the pedal 22a, the operating rod 17 including the operating rod arm 28 moves to a point where the downward extension 31 engages the end of the slot 30; the length of the slot 30 is such that the operating rod 17 will have traveled .35 of an inch and based on a 10 to 3 ratio the pedal 22a will have traveled 1.1666 inches which may be termed the first period of travel. At this point the fulcrum arm 24 is forced to move downwardly, thereby causing the rolling fulcrum 26 to move progressively downward under the influence of the continuing movement of the operating rod arm 28 until contact is made with the stop 33, at which point the distance between the rolling fulcrum 26 and the pivot pin 23 is 1 inch and the downward extension 31 is disengaged from the slot 30; the geometry with respect to the rolling fulcrum 26 and the depending extension 31 is such that the operating rod 17 has traveled an additional .35 of an inch for a crash stop. This second period of travel would cause the pedal to move substantially 1.75 inches, based upon the total travel of the rolling fulcrum 26 which is 2 inches. This is so because it travels progressively from its 3 inch position to a 1 inch position with respect to the pivot pin 23, which adds up to a means fulcrum point of 2 inches. Therefore, the initial travel of 1.1666 inches plus the second period travel of 1.75 inches adds up to a total pedal travel of 3.416 inches for a crash stop as against a total travel of 3½ inches for the "given system."

It is important that the geometry of the various components of my invention must be such so as to give the optimum performance with respect to a given brake system with particular attention to the face 34, the radius of which bears a relationship with respect to the fulcrum arm 24 and the pedal arm 22, for example: initially the face 34 is at an angle with respect to the rolling fulcrum 26 such that it is on a slight incline with respect to its downward movement and thereafter, preferably, is on a very slight decline when the angle between the fulcrum arm 24 and the brake pedal arm 22 changes as a result of the forward movement of the pedal arm 22. If the rolling fulcrum 26 were on a decline, initially, it would start moving downwardly on initial brake application which would not provide optimum performance as to pedal travel. On the other hand, if the rolling fulcrum 26 were always on an incline in its downward movement, a resistance would obviously result which would call for pedal pressure beyond the optimum capabilities of performance.

FIGURE 7 shows a framework 10a which is a modification of the framework 10, and is provided with a pair of depending arms 44 pivotally connected at their upper ends, one each, to opposite sides of the end of the framework 10a by pivot pins 45. The lower ends of the depending arms 44 are pivotally connected, one each, on the opposite sides of the brake pedal arm 22, by a pivot pin 23a which extends through the operating rod 17 whereby the depending arms 44 are pivotally interconnected to the operating rod 17 and the brake pedal arm 22, thereby supporting both.

It is therefore apparent that the modified framework 10a, including the pair of depending arms 44, interconnected as shown provide support means for the brake pedal arm 22 including the operating rod 17 which is provided with a spring 35a interposed between a stop 46 connected to the operating rod 17 and the framework 10a.

It is manifestly apparent that with modification of my invention shown in FIGURES 5 and 6 which sows sensing means with respect to the hydraulic pressure in the master cylinder and the other modifications and additions are also applicable to the modification shown in FIGURE 7.

I claim:

1. A mechanical linkage comprising:
   (1) a framework connected to ground,
   (2) a fulcrum arm having a depending extension and pivotally connected at one end thereof to said framework,
   (3) a fulcrum connected to the other end of said fulcrum arm,
   (4) a first arm having a face at its upper end operably engaged with said fulcrum,
   (5) an operating rod pivotally connected to said first arm, for moving a work load,
   (6) means for supporting said first arm, and
   (7) a second arm operably connected with respect to said first arm and having a slot therein operably engageable with said depending extension, whereby when said operating rod is moved forward the said fulcrum moves downwardly because of the interconnecting engagement between the said depending extension and the said second arm.

2. A mechanical linkage according to claim 1, wherein the said fulcrum is a roller.

3. A mechanical linkage according to claim 1, wherein the said fulcrum arm terminates in a yoke which carries the said fulcrum at its end.

4. A mechanical linkage according to claim 1, wherein the said means for supporting the said first arm comprises at least one depending arm pivotally interconnected to said framework and said first arm.

5. A mechanical linkage for use in the operation of a brake system comprising:
   (1) a framework connected to ground,
   (2) a fulcrum arm having a depending extension and pivotally connected at one end thereof to said framework,
   (3) a rolling fulcrum connected to the other end of said fulcrum arm, (4) a brake pedal arm having a face at its upper end operably engageable with said rolling fulcrum,
(5) an operating rod pivotally connected to said brake pedal arm operably connected with respect to the piston in a master cylinder,
(6) means for supporting said brake pedal arm,
(7) an operating rod arm connected to said operating rod and having a slot therein for receiving the said depending extension, whereby when said operating rod is moved forward, the said fulcrum arm is caused to swing downwardly thereby causing the roller fulcrum to roll downwardly on the face of the said brake pedal arm,
(8) stop means limiting the upward and downward movement of the said fulcrum arm, and
(9) spring means urging the said operating rod rearwardly.

6. A mechanical linkage for use in the operation of a brake system according to claim 5, wherein the said face is arcuate in contour and the geometry of the components are such that when the rolling fulcrum rolls downwardly, the said face provides a declining surface for the said roller fulcrum.

7. A mechanical linkage for use in the operation of a brake system according to claim 5, wherein the said supporting means comprises at least one arm pivotally interconnecting the said operating rod and the said framework.

8. A mechanical linkage for use in the operation of a brake system according to claim 5, wherein the said depending extension is of a length such that it is released from the said operating rod arm at a point not later than the time of contact with the said stop means on the downward movement of said fulcrum arm.

9. A mechanical linkage for use in the operating of a brake system having a master cylinder, comprising:
(1) a framework connected to ground,
(2) a fulcrum arm having a depending extension and pivotally connected at one end thereof to said framework,
(3) a fulcrum connected to the other end of said fulcrum arm,
(4) a first arm having a face at one end thereof operably engaged with said fulcrum,
(5) an operating rod pivotally connected to said first arm, for moving a work load,
(6) means operably supported by said framework for supporting said operating rod,
(7) a pivoted operating rod arm carried by said operating rod normally tilted downwardly and having a plurality of teeth thereby providing a plurality of slots there-between one of which is engageable with said depending extension,
(8) a sleeve slidably mounted over said operating rod in close proximity to said operating rod arm in the area of its pivotal connection, the said sleeve being pivotally connected to said first arm by a pivot pin which is in engagement with a slot in said operating rod, and
  (a) a spring biased between the said operating rod and a plug in the rearward end of the said sleeve, whereby when the value of said spring is overcome by resistance in the master cylinder the said sleeve is urged against the end of the said pivoted operating rod arm thereby causing one of the slots between the said plurality of teeth of said pivoted operating rod arm to engage the said extension.

10. A mechanical linkage comprising:
(1) a framework connected to ground,
(2) a fulcrum arm having a depending extension and pivotally connected at one end thereof to said framework,
(3) a fulcrum connected to the other end of said fulcrum arm,
(4) a first arm having support means operably connected to said framework and provided with an arcuate face at its upper end operably engaged with said fulcrum,
(5) an operating rod pivotally connected to said first arm for moving a workload, and
(6) a second arm operably connected to said first arm having a slot therein operably engaged with said depending extension, whereby when said operating rod is moved forward, the said fulcrum moves downward when the said depending extension is in contact with the confronting face of said slot.

References Cited

UNITED STATES PATENTS

| 1,808,121 | 6/1931 | Smith | 74—516 |
| 2,112,607 | 3/1938 | Pooley | 74—516 |
| 2,977,817 | 4/1961 | Panasewicz | 74—516 |

MILTON KAUFMAN, *Primary Examiner.*